Inventors:
Jean Joly
Georges Blangeard
By Kenyon, Palmer & Estabrook
Attorneys

Inventors:
Jean Joly
Gerard Blanguard
By Kemon Palmer & Estabrook
Attorneys

Inventors:
Jean Joly
Gérard Blangeard
By Kemon, Palmer & Estabrook
Attorneys

Inventors:
Jean Joly
Gérard Blanquart
By Kemon Palmer & Estabrook
Attorneys

Inventors
Jean Joly
Gerard Blangeard
By Kemon Palmer & Estabrook
Attorneys

Inventors
Jean Joly
Gerard Brangeard
By Kemon Palmer & Estabrook
Attorneys

United States Patent Office 3,661,754

Patented May 9, 1972

3,661,754

APPARATUS FOR SELECTIVELY ADJUSTING THIN FILM CIRCUIT COMPONENTS OF A COMPLEX NETWORK

Jean Joly and Gerard Blangeard, Paris, France, assignors to Societe Lignes Telegraphiques et Telephoniques, Paris, France Filed Nov. 7, 1969, Ser. No. 874,807
Int. Cl. B01k *3/00;* B23p *1/02;* C23b *5/70*
U.S. Cl. 204—228 4 Claims

ABSTRACT OF THE DISCLOSURE

A method and an apparatus for carrying out said method for selectively adjusting by anodization the resistors of a thin film or hybrid circuit. The circuit is positioned under a thick mask provided with holes registering with the resistors on the circuit lay-out. A jellied electrolyte is spread over the circuit through the mask which is removed. Electrodes prepositioned with respect to the lay-out are placed on the electrolyte spots which are connected to an equipment. Each resistor is associated with three electrodes: two located at each end and connected in an arm of a measuring A.C. bridge, another arm of which is connected to the standard resistor, the third connected at the middle of the resistor and supplying the D.C. anodizing current. Balance of the bridge automatically stops the anodizing current.

BACKGROUND OF THE INVENTION

The present invention concerns a process and an apparatus for selectively adjusting through anodic oxidation the respective values of the resistors entering in a thin-film or hybrid network lay-out. The active or passive components of said networks are produced by cathode sputtering, vacuum evaporation or any other process known per se. Their well known advantages from the point of view of bulkiness, reliability and cost, are such that their use is rapidly widespreading.

The precision obtained in the manufacture of the films, however, does not permit the use of circuits without previous adjustment of some of their components, the resistors for instance. The problem is more delicate the more complicated the circuit layout and the greater the number of elements of different types composing the circuit.

PRIOR ART

In a mass-production line of thin-film circuits, the adjustment of the various components and that of the resistors in particular is a difficult operation. Processes and apparatus able of adjusting by anodic oxidation all the resistors of a thin-film circuit lay-out have already been described. Reference is made in particular to the U.S. patents filed by the Western Electric Co. No. 3,391,065 filed on Feb. 9, 1966 for: "Method and Apparatus for Selective Anodizing of Metallized Substrates," No. 3,341,444 filed on Sept. 1, 1964 for "Anodization Control Circuits" and No. 3,341,445 filed on Sept. 1, 1964 for "Anodization Control Circuits" and also Pat. No. 3,365,379 filed in the United States of America on Apr. 13, 1965 and assigned to the Lockheed Aircraft Corporation for "Method and Apparatus for Controlling the Anodization of Film Resistors."

SHORT DISCLOSURE OF THE INVENTION

A method and an apparatus for carrying out said method for selectively adjusting by anodization the resistors of a thin film or hybrid circuit. The circuit is positioned under a thick mask provided with holes registering with the resistors on the circuit lay-out. A jellied electrolyte is spread over the circuit through the mask which is removed. Electrodes prepositioned with respect to the lay-out are placed on the electrolyte spots which are connected to an equipment. Each resistor is associated with three electrodes: two located at each end and connected in an arm of a measuring A.C. bridge, another arm of which is connected to the standard resistor, the third connected at the middle of the resistor and supplying the D.C. anodizing current. Balance of the bridge automatically stops the anodizing current.

ADVANTAGES OF THE INVENTION

Considering the above prior art, the present invention concerns a process and apparatus which adds an increase to or at least maintains the yields of thin-film circuit manufacture, while reducing the time and labour necessary for the adjustment of the components and more specifically the resistors, and increasing the precision.

Simultaneous oxidation of the elements to be adjusted by direct current and continuous measurement of their value by alternating current allow the suppression of any switch either mechanical or electronic in the oxidizing circuit. Continuous control of the resistance value permits more precise adjustment than that obtained in the prior art, while reducing the time of the operation to a few seconds.

Placing electrolyte paste on the elements to be adjusted through a mask designed for this purpose is a precise, simple and error proof operation. This process is free from any complicated assembly or containers or saturated plugs required by the use of liquid electrolyte. The pasty nature of the electrolyte prevents it from running, damaging the thin-film contacts of the circuit and falsifying the measurements. On the other hand, the distribution of the oxidizing current in the block of jelly thus formed on each element to be adjusted may be calculated. It is therefore possible to choose the thickness of the mask so as to deposit automatically on each component the volume of electrolyte which will provide uniformity of the oxidizing electric field.

The apparatus for carrying out the method according to the invention are very flexible in use. They may be adapted rapidly to the manufacture of any lay-out of thin film circuits.

The circuits, supplied from the metallisation step, are protected against contamination during the adjusting step, through the use of vacuum for holding them in position. No mechanical contact on the circuit is required. Once the apparatus is set for a given circuit lay-out, manual intervention is limited to loading in position the circuits to be adjusted, the spreading of electrolyte and the unloading of the circuits from the apparatus. All the resistors of the same thin-film circuit are adjusted automatically and rapidly without any handling by the operator. The precision of adjustment depends solely on the sensitivity of the measuring devices and the time constant of the control circuit of the oxidizing circuit. These advantages result in a considerable saving of time and in increased precision. Thus, by using the method of the invention adjustment to within $1/1000$ of the value of about 30 resistors covering the 10 to 100,000 ohms range can be achieved in 10 sec.

According to a particular design, an apparatus for carrying out the invention comprises four principal parts: a supporting base for film circuits, a cover pivoting relative to the base and carrying the positioning reference system of the circuit and the mask, a contact-carrying plate and a set of adjustment channels comprising the sources of oxidizing and measuring currents. The number of channels depends on the lay-out of film circuits to be manufactured and the time allowed for the adjusting operation. Indeed, one channel permits the control of the oxidation of one component. If as many channels are provided as there are components to be adjusted, the different components may be treated simultaneously and the duration of the operation is that of a single oxidation. In the other extreme, each of the component may be adjusted successively under the control of a single channel (including the necessary switching of the reference value), and the duration of the operation corresponds to that of a single oxidation multiplied by the number of components to be treated.

DETAILED DISCLOSURE OF THE INVENTION

To fix the ideas and simplify the drawings, in the following is described an apparatus for the adjustment of the resistors of a thin-film circuit comprising only four resistors to be adjusted. This apparatus is only given as particular embodiment and does not constitute a limitation of the invention. The description will be better understood with reference to the accompanying drawings in which.

Figure 1:
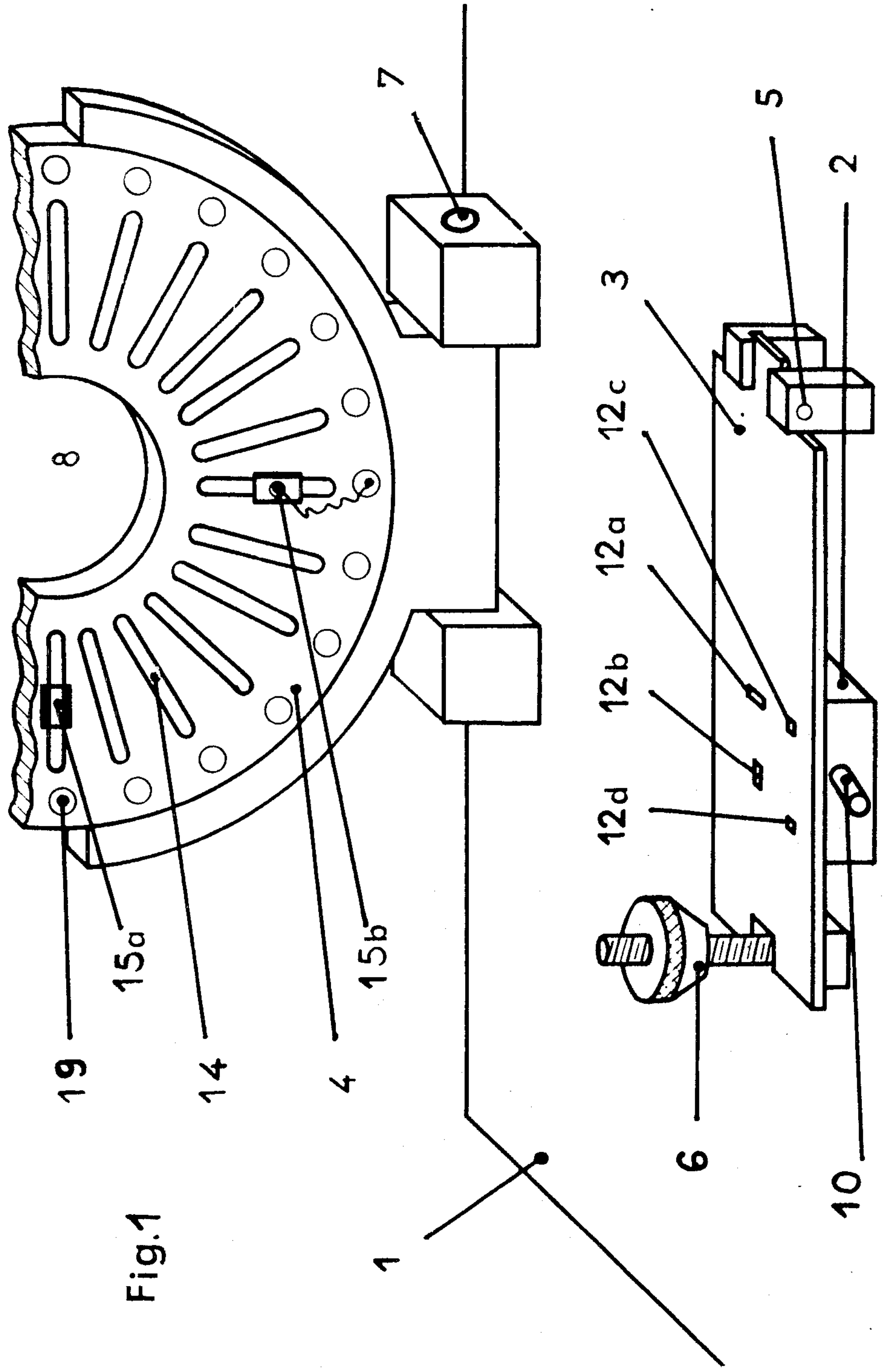
FIG. 1 shows in perspective a view of the apparatus.

Fixed to a rigid frame 1, FIG. 1, are the supporting base 2, its cover 3 and the contact-carrying plate 4. Machining of these parts and their mounting on the frame are carried out with great precision. The supporting base 2 is solid with frame 1. Cover 3, on the contrary, is adapted to pivot through 180° on the pin 5; it may be held in the closed position shown in FIG. 1 by the knurled nut 6. Similarly, the contact-carrying plate 4, shown in the raised position in FIG. 1, may pivot through 90° on the pin 7. When the contact-carrying plate is turned down into the horizontal position its cut-away centre 8 covers the top of the supporting base 2.

Figure 2:
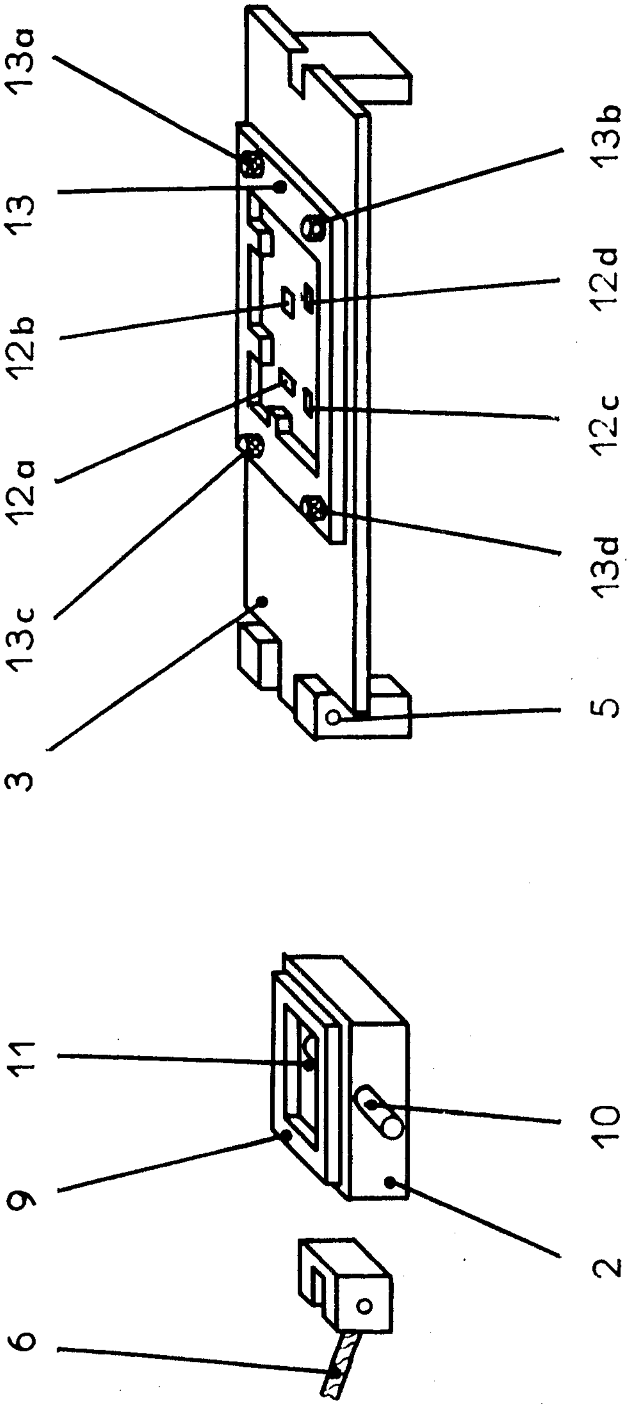
FIG. 2 shows in perspective a view of the thin-film circuit supporting base and its cover.

FIG. 2 shows the supporting base 2 (the cover being turned down to the right in the open position). The base is topped by a resilient seal 9 of plastics material. A pipe 10 opens at the centre of the base by an orifice 11. The pipe 10 is connected by a flexible tubing to a vacuum pump not shown. The cover 3 forms the mask for the localization of the electrolyte jelly. Its thickness depends on the quantity of electrolyte to be deposited on the resistors for ensuring uniformity of the oxidizing electric field. It is interchangeable, the manufacture of each lay-out of thin-film circuit involves the use of a matched mask. The cover carries holes such as 12a, 12b, 12c, 12d, for example, visible in FIGS. 1 and 2. The position of these holes corresponds to that of the resistors in the thin-film circuit to be adjusted. The reference positioning device used throughout the manufacture of the thin-film circuit for precise positioning and registration with the masks in the various manufacturing stages, is fixed to the inner face of the cover 3. The device, shown at 13 in FIG. 2, corresponds to that described in the patent application SN 779,792 filed by the applicants in the United States on Nov. 29, 1968 for: "Improved Apparatus for the Relative Positioning of Two Plane Parts" and now Pat. No. 3,584,960. It is held against the cover by means of four nuts 13a, 13b, 13c, 13d engaged on four screwthreaded rods fixed to the cover. The diameter of the through-holes made in the reference system 13 is slightly larger than that of the screwthreaded rods for allowing sufficient play to permit, before the nuts are tightened, precise positioning of the reference system 13 relative to the holes 12 of the mask in the cover.

Figure 3:
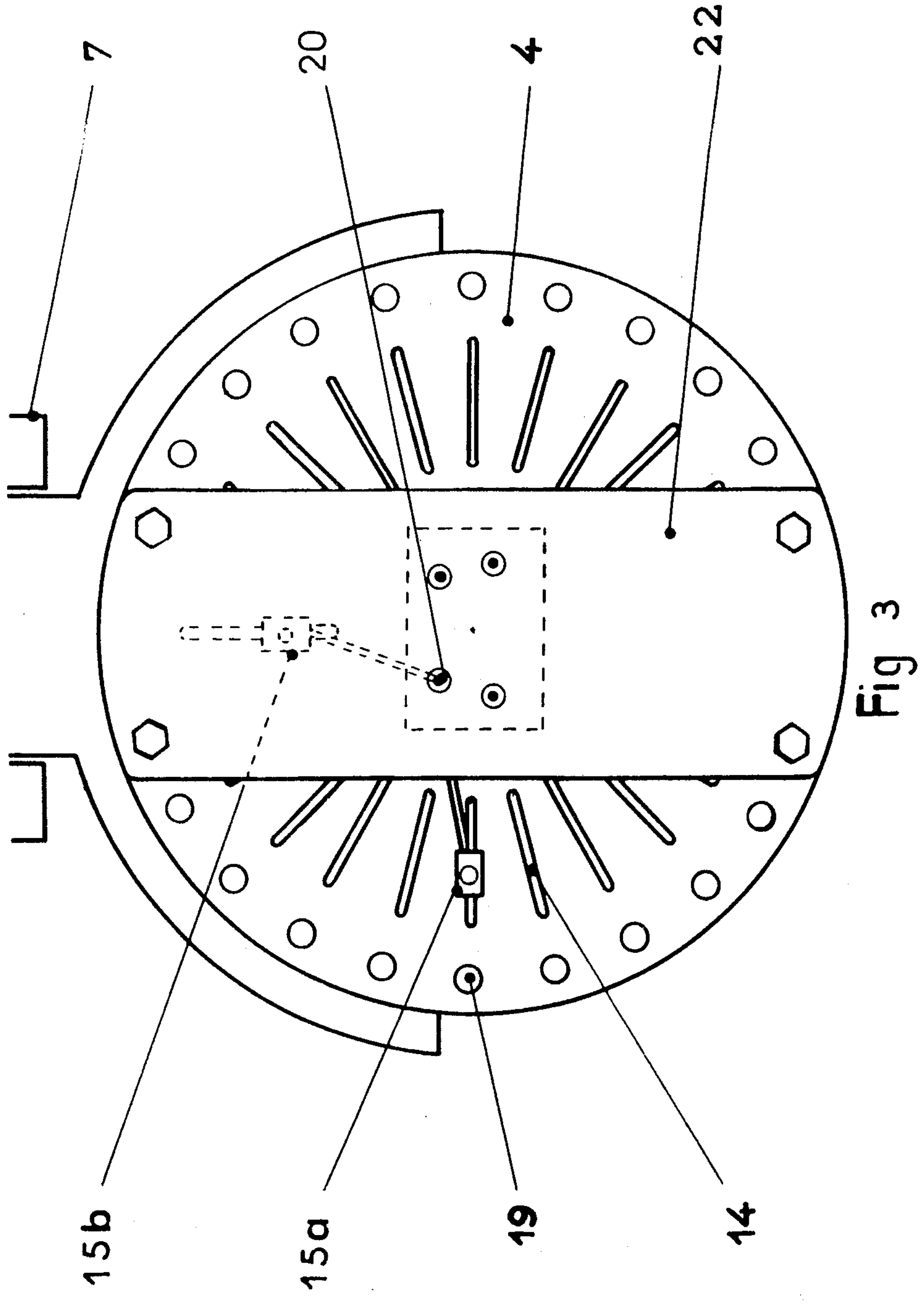
FIG. 3 shows a view in plan of the contact-carrying plate.
Figure 4:
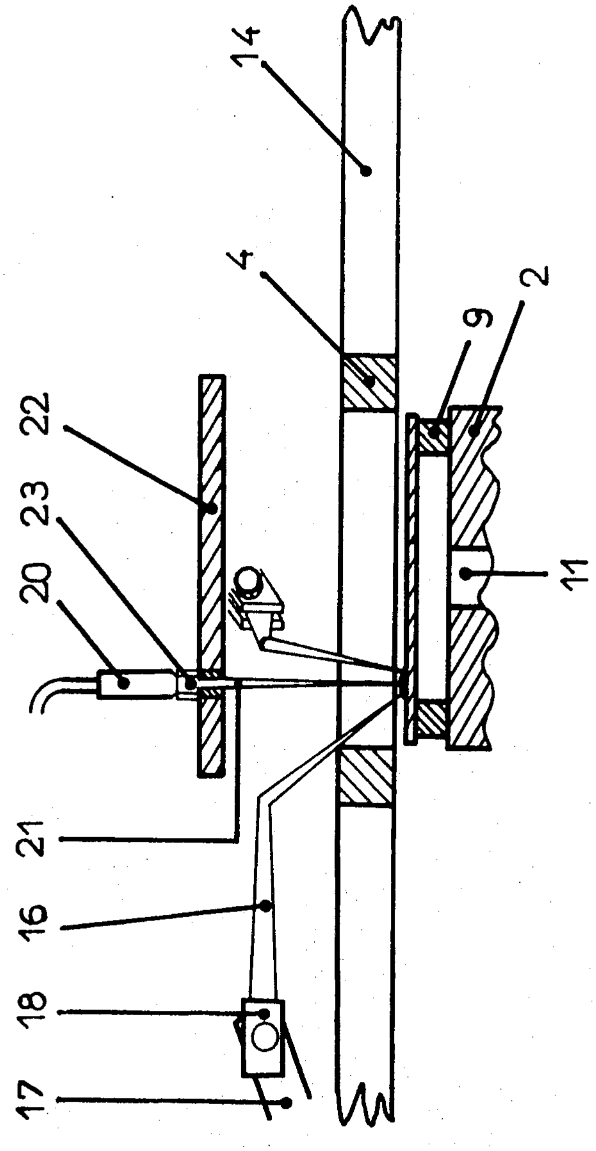
FIG. 4 shows a section of the central part of the apparatus.

The contact-carrying plate, FIG. 3, groups together all the parts necessary for the oxidation of the resistors and for the testing. It comprises a circular plate 4, in the thickness of which radial grooves 14 are provided in a number sufficient for locating therein, taking into account the number of resistors in the circuits, three electrodes per resistor. The two electrodes necessary for their testing, such as 15a and 15b for example, comprise, FIG. 4, a tip 16 of gilded metal mounted on an arm 17 by means of a joint 18. Each electrode slides in a groove 14 and is adapted to be locked after being placed in position and after adjustment of the position of the tip by means of the joint 18. A flexible connection, not shown, is provided between each electrode 15a, 15b . . . , FIG. 3, and one of the connecting terminals 19 distributed over the periphery of the plate 4. The oxidizing electrodes 20, also formed of gilded metal tips 21, FIG. 4, are mounted on a plate 22 of insulating material fixed to the plate 4 at a sufficient distance from the latter to permit free movement of the electrodes 15. The height of the tip 21 may be adjusted by means of a micrometer screwthread 23. The plate 22 is interchangeable; the manufacture of a circuit of given lay-out involves the use of a plate being machined according to the position of the resistors in the circuit. The plate 22 is rigidly positioned such that the tips 21 coincide with the centres of the resistors. The electrical supply of this electrode is provided through a plug inserted in the head of the electrode 20.

Figure 5:
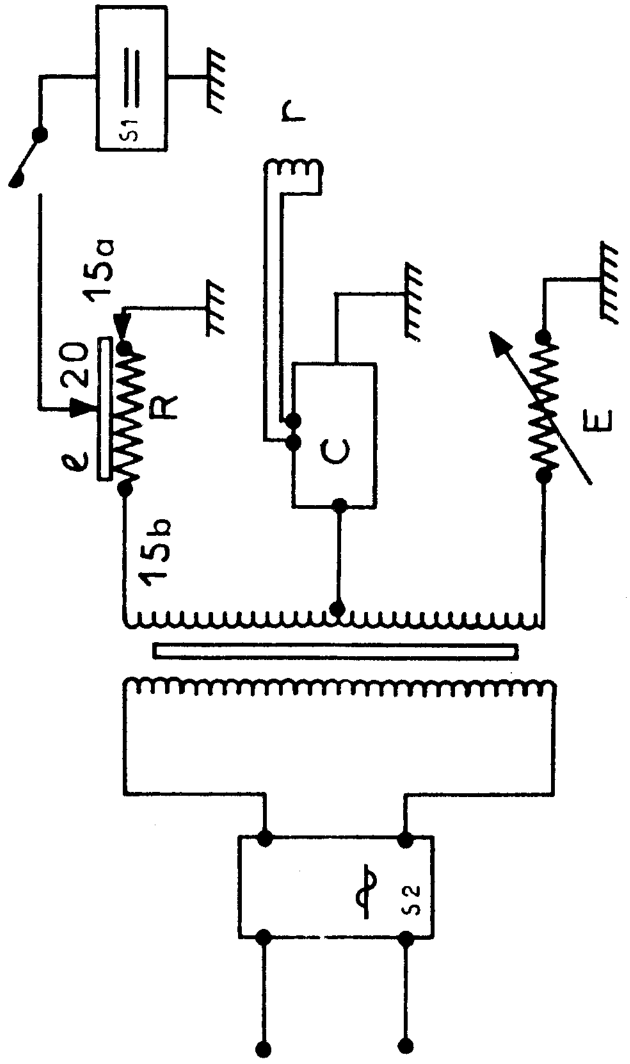
FIG. 5 shows a basic diagram of an adjustment channel.

The electrical and electronic circuits of the apparatus constitute the adjustment channels connected to the components to be adjusted through the conductive paths terminating at the electrode 15 and 20 tips. The basic diagram of a channel is shown in FIG. 5. Each channel makes it possible to supply the component R to be adjusted with oxidizing direct current flowing between the electrodes 20 and **15*a*** through the electrolyte *e* and supplied by the source $S_1$ and to check continuously the resistance measured between the electrodes **15*a* and 15*b*** by comparison with a standard resistor E connected in a measuring bridge operated by an 800 cycle A.C. supplied by the source $S_2$. When equilibrium of the bridge is reached, a pulse emitted by the comparator C cuts-off the oxidizing current by means of the relay *r*, whose response time is of the order of a millisecond. Each element to be adjusted in the thin-film circuit may be associated with its own channel, whereby the adjustment of all the components is carried out simultaneously and in the minimum time.

Figure 6:
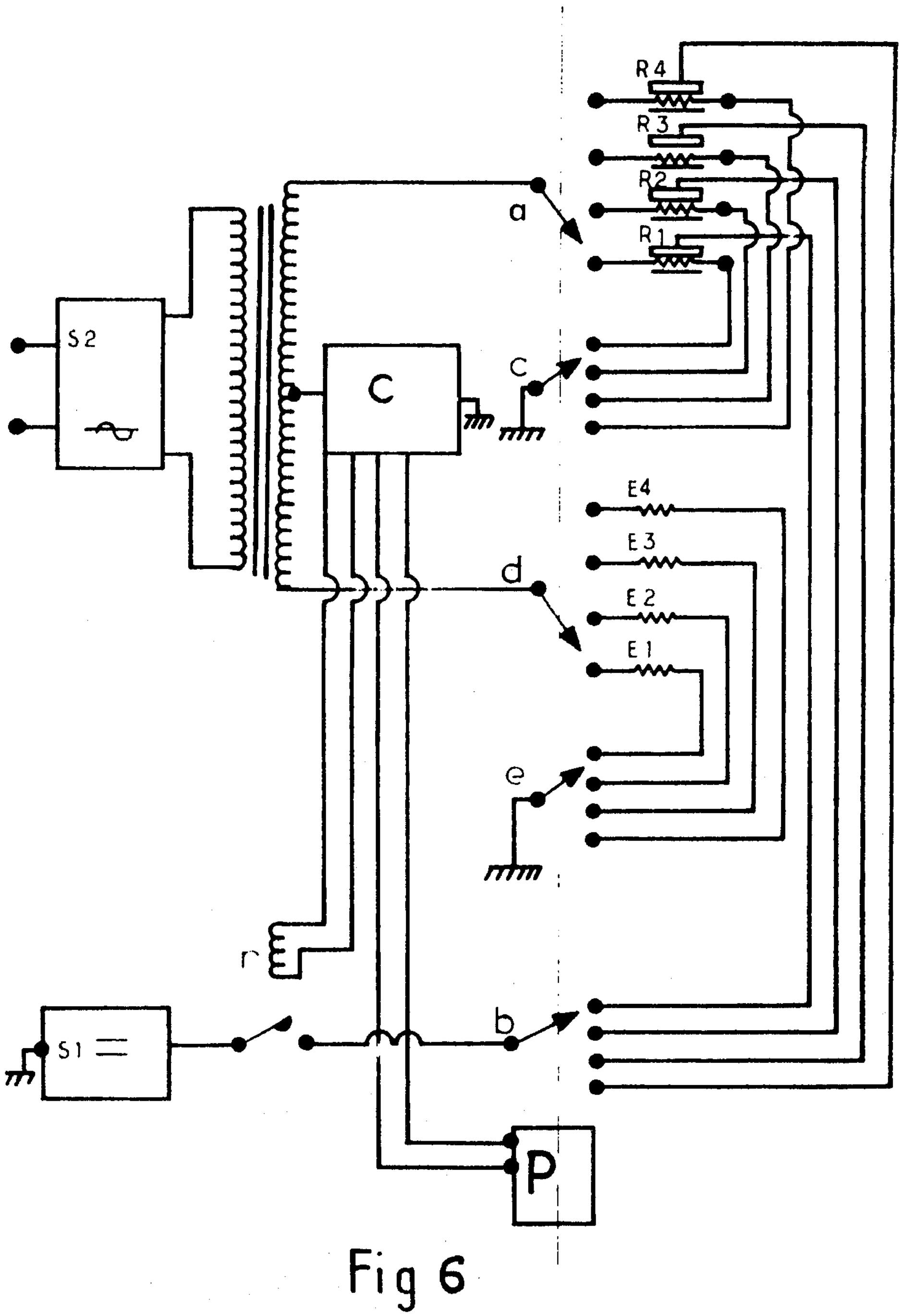
FIG. 6 shows a diagram of a modified adjustment channel.

Thin-film circuits, however, generally comprise a large number of components to be adjusted and an apparatus of this kind may involve a considerable investment of equipment. On the other hand, the duration of the oxidization is in practice very short compared with the time required for its preparation. For the sake of economy, therefore, it is sometimes preferable to carry out successively the adjustment of each resistor of a circuit on the same channel through a switching system connecting successively to the measuring bridge the resistors R to be adjusted and the corresponding standard resistor E. This extreme solution, in contrast to the first one described, however, complicates the electrical circuitry and requires multiple position switches likely to reduce the reliability of the apparatus. A compromise is usually selected, such as is shown diagrammatically in FIG. 6, where the number of components to be adjusted per channel has been reduced to four. When the channel is put into service, the first resistor $R_1$ to be adjusted is fed with oxidizing direct current, and is compared continuously with the standard $E_1$ through the measuring bridge. When equilibrium is reached, the said measuring bridge transmits a pulse on the one hand to the relay *r* which interrupts the oxidizing current, and on the other hand to an electromechanical switch P, which controls the step-by-step advance of the contractors *a*, *b*, *c*, *d* and connects the resistor $R_2$ and the standard $E_2$ to the measuring bridge. The operation is continued automatically and is effected simultaneously on all the channels put into service.

The use of the apparatus involves previous machining of the cover 3 and plate 22 adapted to the lay-out of the circuits being manufactured. Once these parts are in position on the apparatus, set-up of the positioning device 13 relative to the holes 12 is carried out, using a test part. Then the positioning of the electrode tips is achieved so that the electrode tips 15 bear on either side of each resistor on the contact areas usually provided, and such that the tips 21 ensure contact with the electrolytic paste at the centre of each resistor. A high number of grooves 14 on the contact-carrying plate 22 facilitates this positioning by permitting a choice of the grooves best located for reaching each resistor of the lay-out. The electrodes are then interconnected in the adjustment channel and the standard resistors are plugged in.

The use of the apparatus is error-proof. It comprises the following operations: the substrate of the thin-film circuit from the metallisation shop after suitable cleaning, is introduced manually into the positioning device 13, so that the face carrying the circuit bears against the cover 3. The resistors to be adjusted are thus placed exactly opposite the holes 12, and the cover 3 acts as a mask relative to the thin-film circuit. The whole cover is then turned down on the circuit supporting base 2 and is locked in this position by means of the knurled nut 6. The operator, using a spatula, spreads on the holes 12 electrolyte paste having the consistency of a jelly. The viscosity of the electrolyte is important in order to prevent any under flow under the mask. The electrolyte should retain the shape of the holes in the mask. It should also be soft enough to allow easy spreading so as to fill exactly the shape of the holes in the mask. Experience has shown that conductive jellies with an ASTM penetration index between 180 and 210 are suitable. Then he starts the vacuum pump. The substrate, being aspirated, is applied firmly against the seal 9. The cover 3 can then be released from the nut 6 and turned away (FIG. 2), and the plate 4 lowered by means of a pneumatic jack into the horizontal position. Contact is thus established between the resistors to be adjusted and the adjustment channels. The operation of oxidation of the resistors, started by switching on the equipment, is automatic. It is stopped automatically for each resistor when the measured value is equal to the reference value. Disengagement of the adjusted circuit is effected by raising the plate 4 and breaking the vacuum.

What we claim:

1. A semi-automatic apparatus for selective adjustment through anodization of resistors included in a thin film or hybrid circuit comprising a solid mask having openings matching the location of said resistors of said circuit associated with a positioning jig for said circuit, rotatably mounted with respect to a circuit support;

a circuit support fixed with respect to said apparatus consisting of a joint on the opening of a cavity connected to a pipe in relation with a vacuum pump;

an electrode carrier consisting of a disc machined with radial slots along which electrodes are adjustably mounted, said electrode carrier being rotatably mounted with respect to said circuit support;

a plurality of measuring bridges connected to a first plurality of electrode pairs, a plurality of anodizing current sources supplying a second plurality of electrodes, said first and second pluralities connected to the electrodes mounted on said electrode carrier, standard resistors connected in each of said measuring bridges, means for controlling each of said current sources from one of said measuring bridges.

2. A semi-automatic apparatus for selective adjustment through anodization of resistors pertaining to a thin film or hybrid circuit consisting of the following parts:

a solid mask bearing openings matching the location of said resistors on said circuit associated with a positioning jig for said circuit rotatably mounted with respect to a circuit support;

a circuit support fixed with respect to said apparatus consisting of a joint on the opening of a cavity connected to a pipe in relation with a vacuum pump;

an electrode carrier consisting of a disc machined with radial slots along which electrodes are adjustably mounted, said electrode carrier being rotatably mounted with respect to said circuit support;

a plurality of measuring bridges connected to a first plurality of electrode pairs, a plurality of anodizing current sources supplying a second plurality of electrodes, said first and second pluralities corresponding to the electrodes mounted on said electrode carrier, standard resistors connected in each of said measuring bridges, means for controlling each of said current sources from one of said measuring bridges;

switching means for successively connecting the measuring bridges of said plurality to each electrode pair, means for switching on said bridge the corresponding resistor standard, means for interconnecting the third electrode associated with each resistor to the associated anodizing current source.

3. A semi-automatic apparatus for selective adjustment through anodization of resistors pertaining to a thin film or a hybrid circuit consisting of the following parts:

a solid mask bearing openings matching the location of said resistors of said circuit associated with a positioning jig for said circuit, rotatably mounted with respect to a circuit support;

a circuit support fixed with respect to said apparatus consisting of a joint on the opening of a cavity connected to a pipe in relation with a vacuum pump;

an electrode carrier consisting of a disc machined with radial slots along which electrodes are adjustably mounted, said electrode carrier being rotatably mounted with respect to said circuit support;

a measuring bridge connected through a first switching device to one of said electrode pairs, an anodizing current source connected through a second switching device to the third electrode associated with the same resistor as said electrode pair, a third switching device interconnecting a reference standard resistor in said measuring bridge, means for cutting-off said current source when said bridge is balanced, means for controlling said first, second and third switching devices to advance one step, when said balance is reached, until all the resistors have been adjusted.

4. A semi-automatic apparatus for simultaneous adjustment through anodization of resistors of different values included in a thin film or a hybrid circuit comprising:

means for positioning the circuit in registration with a solid mask bearing openings matching said resistor locations;

means for positioning said mask and circuit assembly on to a circuit support;

suction means for locking said circuit on said support;

means for spreading a pasty electrolyte with an ASTM penetration index in the 180 to 210 range on said circuit through said mask;

means for removing said mask from said circuit;

means for positioning an electrode carrier so that the electrodes belonging to a first set of pairs of electrodes contact the extremities of each resistor and an electrode pertaining to a second set of electrodes contact the middle point thereof;

means for switching on a plurality of measuring bridges each connected to one pair of electrodes of the first set of electrodes and a plurality of anodizing current sources supplying the electrodes of the second set associated with the pairs of electrodes of the first set connected to the plurality of measuring bridges, with anodizing current; and means for switching successively said plurality of measuring bridges and current sources respectively to the remaining pairs of electrodes and electrodes of the second set until all the electrode pairs have been connected to one measuring bridge.

References Cited

UNITED STATES PATENTS

| | | | |
|---|---|---|---|
| 2,987,460 | 6/1961 | Mizia et al. | 204—297 |
| 3,536,594 | 10/1970 | Pritchard | 204—297 |
| 3,148,129 | 9/1964 | Basseches et al. | 204—228 |
| 3,282,821 | 11/1966 | Cistola | 204—141 |

| | | | |
|---|---|---|---|
| 3,341,444 | 9/1967 | La Chapelle | 204—228 |
| 3,481,843 | 12/1969 | Koo | 204—228 |

OTHER REFERENCES

Western Electric Technical Digest No. 4, October 1966, pp. 1 and 2, Viscous Electrolyte Anodizing, by T. A. Bradley et al.

JOHN H. MACK, Primary Examiner

T. TUFARIELLO, Assistant Examiner

U.S. Cl. X.R.

204—224, 297 R